United States Patent
Arora et al.

(10) Patent No.: US 11,282,511 B2
(45) Date of Patent: Mar. 22, 2022

(54) SYSTEM AND METHOD FOR AUTOMATIC SPEECH ANALYSIS

(71) Applicant: Oxford University Innovation Limited, Oxford (GB)

(72) Inventors: Vipul Arora, Oxford (GB); Aditi Lahiri, Oxford (GB); Henning Reetz, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 247 days.

(21) Appl. No.: 16/605,025

(22) PCT Filed: Apr. 17, 2018

(86) PCT No.: PCT/GB2018/051008
§ 371 (c)(1),
(2) Date: Oct. 14, 2019

(87) PCT Pub. No.: WO2018/193241
PCT Pub. Date: Oct. 25, 2018

(65) Prior Publication Data
US 2021/0134277 A1    May 6, 2021

(30) Foreign Application Priority Data
Apr. 18, 2017 (GB) .................................... 1706078

(51) Int. Cl.
| G10L 15/187 | (2013.01) |
| G09B 19/04 | (2006.01) |
| G10L 15/02 | (2006.01) |
| G10L 15/14 | (2006.01) |
| G10L 15/16 | (2006.01) |
| G10L 15/22 | (2006.01) |
| G09B 19/06 | (2006.01) |

(52) U.S. Cl.
CPC ............ *G10L 15/187* (2013.01); *G09B 19/04* (2013.01); *G10L 15/02* (2013.01); *G10L 15/14* (2013.01); *G10L 15/16* (2013.01); *G10L 15/22* (2013.01); *G09B 19/06* (2013.01); *G10L 2015/025* (2013.01)

(58) Field of Classification Search
CPC ....... G09B 19/06; G09B 19/04; G10L 15/187; G10L 15/16
See application file for complete search history.

(56) References Cited

U.S. PATENT DOCUMENTS

| 8,744,856 | B1 | 6/2014 | Ravishankar | |
| 2006/0057545 | A1* | 3/2006 | Mozer ................... | G09B 19/04 434/156 |
| 2009/0150154 | A1 | 6/2009 | Jang et al. | |
| 2009/0305203 | A1* | 12/2009 | Okumura ................ | G10L 15/25 434/185 |
| 2013/0189652 | A1* | 7/2013 | Marttila ................. | G09B 19/06 434/156 |
| 2014/0006029 | A1* | 1/2014 | Stanley .................. | G09B 19/06 704/254 |
| 2014/0205974 | A1* | 7/2014 | Pellom .................. | G10L 15/197 434/157 |
| 2015/0106082 | A1 | 4/2015 | Ge et al. | |
| 2021/0134277 | A1* | 5/2021 | Arora ..................... | G10L 15/02 |

FOREIGN PATENT DOCUMENTS

| EP | 1947643 A1 | 7/2008 |
| WO | 2014005142 A2 | 1/2014 |
| WO | 2015092711 A1 | 6/2015 |

OTHER PUBLICATIONS

Li, Kun, et al., "Mispronunciation Detection and Diagnosis in L2 English Speech Using Multidistribution Deep Neural Networks," IEEE/ACM Transactions on Audio, Speech, and Language Processing, 2017, pp. 193-207, vol. 25, No. 1, doi: 10.1109/TASLP.2016.2621675.

Wang, Yow-Bang and Lin-shan Lee, "Supervised Detection and Unsupervised Discovery of Pronunciation Error Patterns for Computer-Assisted Language Learning," IEEE/ACM Transactions on Audio, Speech, and Language Processing, 2015, pp. 564-579, vol. 23, No. 3, doi: 10.1109/TASLP.2014.2387413.

Povey, Daniel, et al., "The Kaldi Speech Recognition Toolkit," IEEE workshop on Automatic Speech Recognition and Understanding, ASRU, 2011, pp. 1-4.

(Continued)

*Primary Examiner* — Samuel G Neway
(74) *Attorney, Agent, or Firm* — Thomas|Horstemeyer, LLP

(57) ABSTRACT

A computer implemented method for automatic speech analysis comprising setting a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified, receiving a speech signal, wherein the speech signal comprises a user's attempt to say the target phrase, analysing the speech signal to determine the phonological features present within a portion of the speech signal corresponding to the target phoneme and assigning a probability to each of the set of phonological features, comparing the probability assigned to each phonological feature based on the speech signal to the expected target value of that phonological feature within the phrase, determining a deviation from the comparison; and outputting the deviation to provide feedback on the closeness of the speech signal to the phrase.

20 Claims, 4 Drawing Sheets

(56) References Cited

OTHER PUBLICATIONS

Livescu, Karen and James Glass, "Feature-based Pronunciation Modeling for Speech Recognition," HLT-NAACL, Association for Computational Linguistics, 2004, pp. 81-84.
Livescu, Karen, et al., "Articulatory Feature-Based Pronunciation Modeling," Computer Speech and Language, 2015, pp. 212-232, vol. 36.
Lahiri, Aditi and Henning Reeiz, "Distinctive features: Phonological underspecification in representation and processing," Journal of Phonetics, 2010, pp. 44-59, vol. 38, Elsevier Ltd., 10.1016/j.wocn. 2010.01.002.
Albright, Adam, et al., "Lexical Representations: Probing Underlying RepresentationsAsymmetric Phonological Representations of Words in the Mental LexiconThe Lexicon: Not Just Elusive, But Illusory?The Dynamic Lexicon," The Oxford Handbook of Laboratory Phonology, 2011, pp. 1-55, doi: 10.1093/oxfordhb/ 9780199575039.013.0008.
Raab, Martin, et al., "Non-Native Speech Databases," Proceedings of ASRU, 2007, pp. 1-6.
Menzel, Wolfgang, et al., "The ISLE corpus of non-native spoken English," Proceedings of LREC: Language Resources and Evaluation Conference, 2000, pp. 957-964, vol. 2, Athens, Greece, European Language Resource Association.
Witt, Silke Maren, "Use of Speech Recognition in Computer-assisted Language Learning," University of Cambridge Ph.D. thesis, 1999, i-139, Cambridge, United Kingdom.
Li, Wei, et al., "Improving Mispronunciation Detection for Non-Native Learners with Multisource Information and LSTM-Based Deep Models," Interspeech, 2017, pp. 2759-2763, Stockholm, Sweden, doi: 10.21437/Interspeech.2017-464.
Hu, Wenping, et al., "Improved mispronunciation detection with deep neural network trained acoustic models and transfer learning based logistic regression classifiers," Speech Communication, 2015, pp. 154-166, vol. 67, doi: 10.1016/j.specom.2014.12.008.
Arora, Vipul and Aditi Lahiri, "Attribute Based Shared Hidden Layers for Cross-Language Knowledge Transfer," pp. 1-7.
Li, Wei, et al., "Improving Non-Native Mispronunciation Detection and Enriching Diagnostic Feedback With DNN-Based Speech Attribute Modeling," ICASSP, 2006, pp. 6135-6139.
Arora, Vipul and Henning Reetz, "Automatic speech Recognition: What phonology can offer," The Speech Processing Lexicon: Neurocognitive and Behavioural Approaches, edited by Aditi Lahiri and Sandra Kotzor, pp. 211-235, Germany, doi: 10,1515/ 9783110422658-011.
International Search Report and Written Opinion for PCT/GB2018/ 051008, dated Jun. 7, 2018, pp. 1-11.
United Kingdom Search Report for GB1706078.1, dated Oct. 19, 2017, pp. 1-3.
Arora Vipul et al: "Phonological feature-based speech recognition system for pronunciation training in non-native language learning", The Journal of the Acoustical Society of America, American Institute of Physics for the Acoustical Society of America, New York, NY, us, vol. 143, No. 1. Jan. 8, 2018 (Jan. 8, 2018), pp. 1-55.
European Examination Report for Application No. 18 721 102.4, dated Jul. 30, 2021, pp. 1-5.
Amit, Y., Koloydenko, A., and Niyogi, P. (2005). "Robust acoustic object detection," J. Acoust. Soc. Am., 118, 2634-2648.
Blumstein, S. E., and Stevens, K. N. (1979). "Acoustic invariance in speech production: Evidence from measurements of the spectral characteristics of stop consonants," J. Acoust. Soc. Am., 66(4), 1001-1017.
Browman, C. P., and Goldstein, L. (1992). "Articulatory phonology: An overview," Pho-netica, 49(3-4), 155-180.
Deng, L., and Sun, D. X. (1994). "A statistical approach to automatic speech recognition using the atomic speech units constructed from overlapping articulatory features," J Acoust Soc Am, 95, 2702.
Franco, H., Neumeyer, L., and Bratt, H. (1999). "Automatic Detection of Phone-Level Mispronunciation for Language Learning," in Proceedings of EuroSpeech.

Franco, H., Neumeyer, L., Digalakis, V., and Ronen, O. (2000). "Combination of machine scores for automatic grading of pronunciation quality," Speech Commun. 30, 121-130. Franco, H., Ferrer, L., and Bratt, H. (2014). "Adaptive and discriminative modeling for improved mispronunciation detection," in Proceedings of ICASSP, pp. 7709-7713. Hasegawa-Johnson, M., et al. (2004), "Landmark-Based Speech Recognition: Report of the 2004 Johns Hopkins Summer Workshop," in Proceedings of ICASSP, pp. 213-216.
Jakobson, R., Fant, G., and Halle, M. (1952). "Preliminaries to Speech Analysis: The Distinctive Features and Their Correlates," MIT Press, Cambridge, MA.
Jansen, A., and Niyogi, P. (2008). "Modeling the temporal dynamics of distinctive feature landmark detectors for speech recognition," J. Acoust. Soc Am., 124, 1739-1758.
Jansen, A., and Niyogi, P. (2009). "Point process models for spotting keywords in continuous speech," IEEE Transactions on Audio, Speech and Language Processing, 17, 1457-1470. Juneja, A., and Espy-Wilson, C. (2008). "A porobabilistic framework for landmark detection based on phonetic features for automatic speech recognition," J. Acoust. Soc. Am., 123(2), 1154-1168.
Kartushina, N., Hervais-Adelman, A., Frauenfelder, U. H., and Golestani, N. (2015). "The effect of phonetic production training with visual feedback on the perception and production of foreign speech sounds," The Journal of the Acoustical Society of America, 138, 817-832. King, S., and Taylor, P. (2000). "Detection of phonological features in continuous speech using neural networks," Computer Speech & Language, 14, 333-353.
Lahiri, Aditi (2012). "Asymmetric phonological representations of words in the mental lexi¬con," In A. Cohn et al. (eds) The Oxford Handbook of Laboratory Phonology, OUP, 146-161. Lahiri, A., Gewirth, L., and Blumstein, S. E. (1984). "A reconsideration of acoustic invariance for place of articulation in diffuse stop consonants: Evidence from a crosslanguage study," J Acoust Soc Am, 76(2), 391-404.
Lee, A., and Glass, J. (2015). "Mispronunciation detection without nonnative training data," InterSpeech, 643-647.
Lo, W., Zhang, S., and Meng, H. (2010). "Automatic Derivation of Phonological Rules for Mispronunciation Detection in a Computer-Assisted Pronunciation Training System Effects with Phonological Rules," InterSpeech, 765-768.
Meng, H., Lo, Y. Y., Wang, L., and Lau, W. Y. (2007). "Deriving salient learners mispro¬nunciations from cross-language phonological comparisons," IEEE Workshop on Automatic Speech Recognition & Understanding (ASRU), 437-442.
Nagamine, T., Seltzer, M. L., and Mesgarani, N. (2015). "Exploring how deep neural networks form phonemic categories," in InterSpeech, 1912-1916.
Niyogi, P., and Sondhi, M. M. (2002). "Detecting stop consonants in continuous speech," J. Acoust. Soc. Am., 111, 1063.
Qian, X., Meng, H., and Soong, F. (2016). "A Two-pass Framework of Mispronunciation Detection & Diagnosis for Computer-aided Pronunciation Training," IEEE/ACM Trans. Audio, Speech, and Language Processing, 24, 1020-1028.
Siniscalchi, S. M., Svendsen, T., and Lee, C.-H. (2013). "A Bottom-Up Modular Search Approach to Large Vocabulary Continuous Speech Recognition," IEEE Trans Audio, Speech, Language Process, 21, 786-797.
Stevens, K. N. (2004). "Fifty years of progress in acoustic phonetics," J. Acoust. Soc. Am., 116, 2496.
Stevens, K. N., and Blumstein, S. E. (1978). "Invariant cues for place of articulation in stop consonants," J. Acoust. Soc. Am., 64, 1358-1368.
Suemitsu, A., Dang, J., Ito, T., and Tiede, M. (2015). "A real-time articulatory visual feedback approach with target presentation for second language pronunciation learning," J. Acoust. Soc. Am., 138, EL382-EL387.
Sun, J., and Deng, L. (2002). "An overlapping-feature-based phonological model incorpo¬rating linguistic constraints: applications to speech recognition," J Acoust Soc Am, 111, 1086-1101.
Tan, S., Sim, K. C., and Gales, M. (2015). "Improving the interpretability of deep neural networks with stimulated learning," in IEEE ASRU, 617-623.

(56) References Cited

OTHER PUBLICATIONS

Van Doremalen, J., Cucchiarini, C., and Strik, H. (2013). "Automatic pronunciation error detection in non-native speech: the case of vowel errors in Dutch," J. Acoust. Soc. Am., 134, pp. 1336-1347.
Yu, D., Siniscalchi, S. M., Deng, L., and Lee, C. H. (2012). "Boosting attribute and phone estimation accuracies with deep neural networks for detection-based speech recognition," in IEEE ICASSP.
European Examination Report for Application No. 18 721 102.4, dated Sep. 10, 2020, pp. 1-6.
Martin Engelcke et al: "Vote3Deep: Fast Object Detection in 3D Point Clouds Using Efficient Convolutional Neural Networks", arxiv .org, Cornell University Library, 201 Olin Library Cornell University Ithaca, NY 14853, Sep. 21, 2016 (Sep. 21, 2016).
Maturana Daniel et al: "VoxNet: A 30 Convolutional Neural Network for real-time object recognition". 2015 IEEE/RSJ International Conference on Intelligent Robots and Systems (IROS), IEEE, Sep. 28, 2015 (Sep. 28, 2015), pp. 922-928.
Xavier Glorot et al: "Deep Sparse Rectifier Neural Networks" In: "Proceedings of the 14th International Conference on Artificial Intelligence and Statistics (AISTATS)", Apr. 13, 2011 (Apr. 13, 2011), JMLR, Fort Lauderdale, FL, USA, XP055312525, vol. 15, pp. 315-323.
Dominic Zeng Wang et al: "Voting for Voting in Online Point Cloud Object Detection", Robotics: Science and Systems XI, Jul. 13, 2015 (Jul. 13, 2015).

\* cited by examiner

SYSTEM AND METHOD FOR AUTOMATIC SPEECH ANALYSIS

CROSS-REFERENCE TO RELATED APPLICATIONS

This application is the National Stage of International Application No. PCT/GB2018/051008, filed Apr. 17, 2018, which claims the priority to GB 1706078.1, filed Apr. 18, 2017, which are entirely incorporated herein by reference.

The project leading to this application has received funding from the European Research Council (ERC) under the European Union's Horizon 2020 research and innovation programme (grant agreement no: 695481).

FIELD OF THE INVENTION

Embodiments of the invention relate to a method of automatic speech analysis and an apparatus operable to carry out the method. In particular, but not exclusively, embodiments relate to a method and system arranged to analyse pronunciation of spoken language.

BACKGROUND OF THE INVENTION

Learning a new language (L2) is common in the modern era of globalisation. Adults often experience difficulties in learning and even perceiving new sounds that are not present in their native language (L1). On the other hand, automatic speech recognition (ASR) technology has made tremendous progress in recent times, becoming a useful tool in assisting the L2 learners, commonly known as computer aided language learning (CALL). A component of CALL systems is computer-aided pronunciation training (CAPT), where the system can detect mispronunciations in the learner's utterances, and can also provide corrective feedback to the learner. Prior art systems are based on holistic phonemes or words.

In the prior art, Extended Recognition Networks (ERNs) are popular for mispronunciation diagnosis. A force alignment process, used in such networks, matches the actually spoken phoneme, thereby achieving both tasks, of detection and feedback, simultaneously. A common problem with this kind of diagnosis, however, is that the mispronunciations that can be detected and diagnosed become limited by the decoding network. Li et al. (Li, K., Meng, H., Chinese, T., Kong, H., and Sar, H. K. (2017). "Mispronunciation Detection and Diagnosis in L2 English Speech Using Multi-Distribution Deep Neural Networks," IEEE/ACM Trans. Audio, Speech, and Lang. Process., 25, 193-207) proposed a way to circumvent this problem by using a free-phoneme recogniser. However, their system is limited as the phoneme uttered as mispronunciation might not belong to the L2 phoneme repertoire. For example, the German phoneme /ø/ does not exist in English and hence, cannot be recognised by an English ASR system. Training on a global phoneme set is one way to incorporate phonemes not in the L2 set (Wang, Y. B., and Lee, L. S. (2015). "Supervised detection and unsupervised discovery of pronunciation error patterns for computer-assisted language learning," IEEE Trans. Audio, Speech and Language Processing, 23, 564-579), but it requires more training data in order to train for extra phonemes and as such can become overly complex and hard to train. The number of phonemes can be quite large; for instance, the UPSID (UCLA (University of California, Los Angeles) Phonological Segment Inventory Database) database has 919 phonemes across 451 languages.

SUMMARY OF THE INVENTION

According to a first aspect of the invention there is provided a computer implemented method for automatic speech analysis comprising at least one of the following:
  (i) setting a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified;
  (ii) receiving a speech signal, wherein the speech signal comprises a user's attempt to say the target phrase;
  (iii) analysing the speech signal to determine the phonological features present within a portion of the speech signal corresponding to the target phoneme and assigning a probability to each of the set of phonological features;
  (iv) comparing the probability assigned to each phonological feature based on the speech signal to the expected target value of that phonological feature within the phrase;
  (v) determining a deviation from the comparison; and
  (vi) outputting the deviation to provide feedback on the closeness of the speech signal to the phrase.

The skilled person will appreciate that a phonological feature is a category that determines a class of segments and is definable in phonetic terms. Phonological features are a finite set which should characterise all segmental contrasts across the world's languages. Various examples are discussed in more detail below.

Embodiments that implement such a method are believed advantageous as they can provide more accurate feedback than prior art systems with less processing power being required. Here, it will be appreciated that the processing of spoken language is a processor intensive activity and providing useful feedback to a learner is a challenge.

Typically the method utilises an Automatic Speech Recognition (ASR) system to determine the phonological features present within the speech signal, and wherein conveniently the ASR output to a further system arranged to determine the deviation and generate feedback.

Conveniently, the method is arranged to generate a probability of a set of phonological features being present within the speech signal. This calculation of the probability may be performed by the ASR.

The method, and maybe the ASR, may use a neural network arranged to output a vector representing the phonological features found within the speech signal.

Further, the ASR may use a Hidden Markov Model (HMM) to determine which of the three values (present; absent; or not specified) each of the phonological features should take.

Conveniently, the ASR outputs to a CAPT (Computer Aided Pronunciation Training) module comprising a further neural network.

In at least some embodiments, the further neural network outputs whether mispronunciation has occurred for any of the phonological features.

Conveniently, the speech signal input to the system is force aligned with the target phrase, which may be thought of as a model for the expected phonemes and phonological features.

The method may comprise accepting a speech signal having an expected set of phonemes present therein.

In some embodiments, the method may comprise asking a user to repeat the target phrase if certain phonemes are not identifiable, The method may comprise determining the actual phonemes that were present in the speech signal, conveniently using a Finite State Transducer (FST).

The method may allow for the insertion of phonemes at boundaries between words.

The deviation, D(f|i), may be determined as:

$$D(f|i) = \begin{cases} 1 - P(f|i) & \text{if } g(f|p_i) = +1 \\ P(f|i) & \text{if } g(f|p_i) = -1 \\ 0 & \text{if } g(f|p_i) = 0, \end{cases}$$

wherein $g(f|p_i)$ is the target value for the phonological feature f of the target phoneme $p_i$ and P(f|i) is the probability of that phonological feature being present in the speech signal, as determined by analysing the speech signal.

The feedback may comprise a first output if a total deviation is below a threshold and a second output if the total deviation is above the threshold.

The feedback may depend on a sign of the deviation, and optionally a positive sign may imply that the phonological feature f should be increased, and a negative sign may imply that the phonological feature f should be decreased.

A Finite State Transducer (FST) may be used to identify which phoneme groups in the speech signal correspond to words such that phoneme insertions word boundaries can be identified. The FST may also be used to determine which word or words were said, The method may further comprise setting a new target phrase based on the deviations by selecting words and/or phonemes containing the phonological feature(s) corresponding to the largest deviation(s).

The feedback may indicate the phonemes and/or phonological features with the largest deviations from the target values.

No deviation may be determined for phonological features for which the target value indicates that the phonological feature's presence is not specified According to a second aspect of the invention, there is provided a system for automatic speech analysis comprising one or more processors arranged to do at least one of the following:

(i) set a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified;

(ii) receive a speech signal, wherein the speech signal comprises a user's attempt to say the target phrase;

(iii) analyse the speech signal to determine the phonological features present within a portion of the speech signal corresponding to the target phoneme and assigning a probability to each of the set of phonological features;

(iv) compare the probability assigned to each phonological feature based on the speech signal to the expected target value of that phonological feature within the phrase;

(v) determine a deviation from the comparison; and (vi) output the deviation to provide feedback on the closeness of the speech signal to the phrase.

According to a third aspect of the invention, there is provided a computer-readable medium containing instructions which when read by a machine cause that machine to perform as at least one of the following:

(i) the method of the first aspect of the invention; and (ii) the system of the second aspect of the invention.

The machine readable medium referred to may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects, or of the embodiments, of the invention may be applied, mutatis mutandis, to any other aspects or embodiments of the invention.

BRIEF DESCRIPTION OF THE INVENTION

There now follows by way of example only a detailed description of an embodiment of the invention, with reference to the accompanying drawings of which:

FIG. 1 schematically shows an overview of a system for automatic speech analysis;

FIG. 2 schematically shows a Finite State Transducer (FST) used for decoding the target phoneme sequence of the sentence "I said";

DETAILED DESCRIPTION OF THE INVENTION

Figure 1:
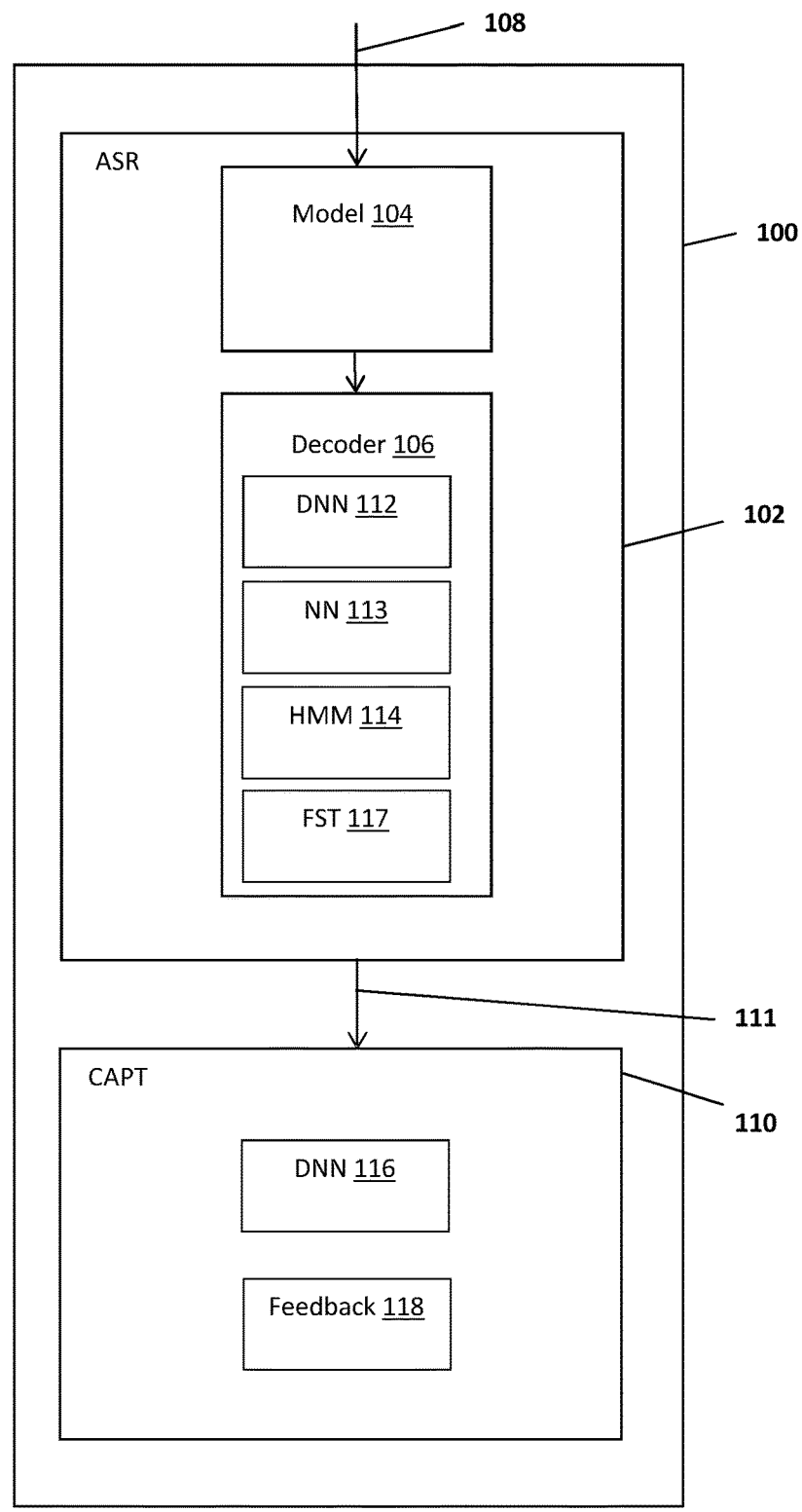

With specific reference now to the drawings in detail, it is stressed that the particulars shown are by way of example and for purposes of illustrative discussion of one embodiment of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how embodiments may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

It will be appreciated that in a pronunciation training system 100, a learner is asked to pronounce a known phrase (i.e. a target phrase) to the system 100, which attempt is input to the system via the speech signal 108. The system 100 subsequently processes that signal to determine what phonemes/phonological features the user spoke and then provides feedback to help improve the pronunciation.

It will be appreciated that learners usually think in terms of the phonemes—i.e. the perceptually distinct sounds made—and that each phoneme is made up of phonological features. Multiple different phonemes may have one or more phonological features in common—an error in one such phonological feature is therefore likely to occur when a learner attempts to say any of the multiple different phonemes. A list of words using some of the multiple different phonemes can therefore be provided to aid a user in practising that phonological feature, based on the phonological feature analysis. The target phrase may simply be a list of words—it does not need to be a sentence, for example.

The system 100 for providing automatic speech analysis, and pronunciation training, will typically comprise an Automatic Speech Recognition (ASR) system 102 consisting of an acoustic model 104 and a decoder 106.

In one example embodiment, the signal 108 is sampled to generate a sequence of typically 16,000 amplitude values per second. This signal 108 is 'cut' into 25 ms long frames (ie 400 samples per frame). These frames are arranged to overlap by 10 ms. Thus, in the example being described, 10 ms equates to 160 samples and a subsequent frame overlaps with the preceding frame over samples 240 through 400. That is a first frame comprises samples 1 to 400 and a subsequent frame comprises samples 240 through 400 (ie 160 samples) of the first frame together with a further 240 samples to give 400 samples in total. This pattern repeats.

These frames are multiplied by a Hamming window to smooth the amplitudes at beginning and end regions of each frame. Subsequently and from each frame a power-spectrum is computed, and in the embodiment being described this is performed using a Fourier-spectrum, which computes the energies for each frequency between 0 and 8,000 Hertz as per the Nyquist criteria. This linear frequency band of 8000 Hz is cut into 23 'bins' according to the Mel Scale, were the lower frequencies have narrower bins and the higher frequencies have wider bins. Thus, the 23 bins contain, in the embodiment being described, spectral values, that represent the acoustics of the signal spoken to the system by the learner and the contents of the bins may be referred to as the probability scores which are subsequently input to the decoder 106.

In other embodiments, other spectral representations other than the Mel Scale may be used. For example other embodiments may use Fourier-spectra, LPC (linear predictive coding spectra), cochleogramms, terz-band filters, etc. as the input for the DNN 112.

In other embodiments, the Hamming window, or indeed other window shape, may have other durations such as substantially any of the following, or any value in between: 10 ms; 15 ms; 20 ms; 30 ms; 35 ms; 40 ms.

Further embodiments may use any other number of binned filters, such as substantially any of the following or any value in between: 13, 15, 17, 19, 21, 25, 27, 29, 31, 33, 40, 50 or more. The length of the bins, in terms of frequency covered, may or may not be according to the Mel Scale.

The embodiment being described uses a Deep Neural Network 112 (DNN) to extract phonological features from the probability scores, derived by the model 104, from the input speech signal 108. Thus, the DNN 112 maps the contents of the input speech signal 108 onto phonological feature probabilities.

Each phoneme is represented with a binary vector of phonological features, with each element as 1 or 0, denoting the presence or absence, respectively, of that phonological feature. This may be thought of as a recognition phase—in the embodiment being described, deviations in pronunciation beyond presence/absence (which may be thought of as severity and/or type of mispronunciation) are assessed later. The DNN 112 output is a vector of phonological features, with each element representing the phonological feature estimated from the input, whose value is a real number between 0 and 1. This mapping is learned from the training data.

In the embodiment being described, the DNN 112 consists of three hidden layers of 500 neurons each, with the rectified linear unit as the non-linearity. The output layer has sigmoid function as the non-linearity at each neuron so as to limit the output between 0 and 1. The skilled person will appreciate that other non-linearities may be used in other embodiments. Moreover, the hidden layers may have any other number of neurons.

A further deep neural network 113 is used to map the features, for which the probability has been determined by the DNN 112, onto the probability that a given phoneme has occurred. In the embodiment being described, the second neural network is arranged to output these phoneme probabilities at substantially 10 ms intervals.

In the embodiment being described, the second DNN 113 comprises one hidden layer again with 500 neurons, each having a rectified linear unit non-linearity, and the output layer with soft-max non-linearity. Other embodiments may have other than 500 neurons and use other non-linearities.

Thus, the second DNN 113 outputs the probabilities that a given phoneme has occurred. Subsequently a Hidden Markov Model (HMM) framework 114 is used to give further certainty as to the phonemes that were spoken in the speech signal 108. The HMM is arranged to process three consecutive 10 ms intervals as output from the NN 113. Each 10 ms interval may be thought of as a state and each state may take the value of any possible phoneme of which the system is aware. Thus, it will be appreciated that for every 10 ms there are many possible states. For example, the NN 113 may output that the value of a state is an /a/ with a probability of 10%, a /e/with a probability of 5%, a /u/ with 0.3%, etc. Thus, the HMM may be thought of as mapping the sequence of its 3-input (10 ms)-frames into a sequence of phoneme probabilities.

Figure 2:
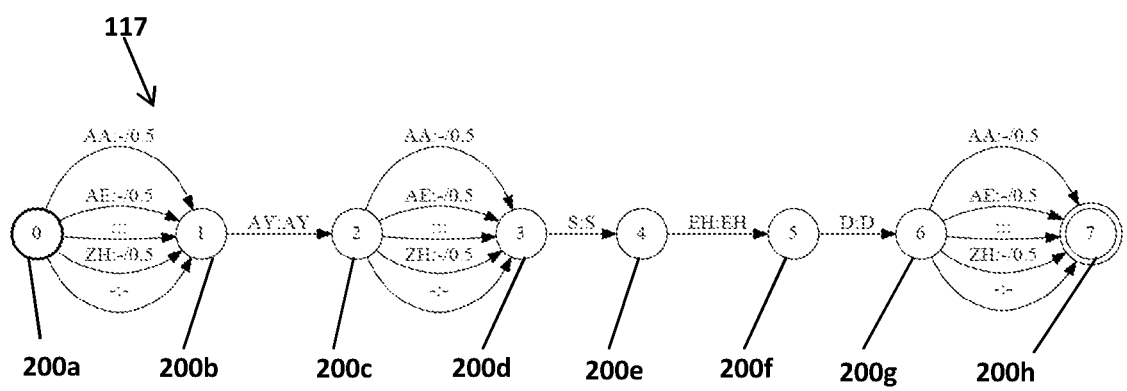

The output of the phoneme probabilities from the HMM 114 is input to a Finite State Transducer (FST) 117 as described in relation to FIG. 2 which highlights how phonemes can be inserted at word boundaries. The FST 117 may be thought of as trying to locate a word to fit the phoneme probabilities output by the HMM 114.

The FST 117 allows insertions (ie extra phonemes) to be handled during decoding of the phoneme sequence from the acoustic scores. Extended Recognition Networks (ERN), which are popularly used, and which some embodiments may use, need expert knowledge or extra training. Moreover, an ERN limits the types of possible insertions. In the embodiment being described, a filler FST 117 is used which allows more flexibility on the types of possible insertions and is perhaps easier to train. The FST 117 is arranged to find the sequence of phonemes in the learner's utterance that maps onto the target phoneme sequence, where the target phoneme sequence will typically be a word/phrase that the learner attempted to speak into the system via speech signal 108. The filler FST 117 takes any phoneme as the input and maps it on to no output, thereby allowing an extra phoneme in the input inserted by the learner. Thus, the FST 117 is able to detect the insertion of a single phoneme. Since too many fillers make the decoding computationally expensive and most insertions occur at word boundaries, the embodiment being described is arranged to introduce fillers only at word boundaries thereby reducing the computational requirements and is felt to balance computational requirements against accuracy.

For instance, Italians tend to insert a /ə/ after word-final consonants, while Spanish speakers tend to insert a /ə/ before word-initial /s/+CONS clusters. Since, only single phonemes are usually inserted, the FST 117 allows insertion of only one phoneme at any given position.

FIG. 2 represents seven nodes 200 a to g, which are states within the FST 117. Node 0 200a represents the start of the FST 117 which in the example being described is used to process the input phrase 'I SAID'. This phrase is represented by the phonemes AY, S, EH, D.

It will be seen that word boundaries exit before and after the phoneme AY (ie the 'I' in the phrase), between the phoneme AY and S (ie between the 'I' and the 'Said' in the phrase), and after the phoneme D (ie after the 'said' in the phrase).

Unless the FST is at a boundary between words, there is a single path between nodes (ie between 200b and 200c; between 200d and 200e; between 200e and 200f; and between 200f and 200g).

The FST 117 knows the phonemes that should be within the speech signal 108, since the learner has been given a target phrase to speak. Thus, in the example being described, the FST 117 is expecting the phonemes AY, S, EH, D. The process that the FST 117 performs is to determine the phonemes that the user actually spoke, noting that there may have been insertions and/or deletions.

The insertion of a phoneme by the filler model is controlled by introducing a penalty term, which is the probability of phoneme insertion $P_{ins}$. There is no penalty when there is no insertion, as transition probability is 1; but transition probability on the arc through any inserted phoneme is $P_{ins} \leq 1$.

Thus, between nodes at word boundaries, which may be referred to as filler nodes, (ie between nodes 200a and 200b; between 200c and 200d; and between 200g and 200h) there are several paths between the nodes each of which allows a different phoneme to be inserted (which includes no insertion—represented by '–'). On each of the arcs between the nodes, there is a phoneme specified (eg AA, AE, ZH) together with a value for $P_{ins}$ for that phoneme.

Although, in the embodiment being described, there are only shown four arcs between the filler nodes (AA; AE; ZH; and '–') there can be any number. Indeed, as discussed elsewhere the phonemes that may be appropriate to insert are likely to be influenced by both the L1 (ie native language) and the L2 (ie the language being learnt) depending upon the phonemes that are present in each.

To train both the above NNs 112,113, the speech waveforms in the training data were aligned with the corresponding actually uttered phonemes by force-alignment, using a GMM-HMM based system (Povey, D., Ghoshal, A., Boulianne, G., Burget, L., Glembek, O., Goel, N., Hannemann, M., et al. (2011). "The kaldi speech recognition toolkit," IEEE Workshop on Automatic Speech Recognition and Understanding, ASRU). The first DNN 112 extracting probabilities of phonological features is trained to minimise squared-error objective function with a stochastic gradient descent algorithm. The second NN 113 for estimating HMM state probabilities is learned by minimising categorical cross-entropy objective function with stochastic gradient descent.

Initially during the training phase of the DNN 112, the DNN 112 is trained and the data used for the training phase is annotated for phoneme boundaries, which do not necessarily coincide with the boundaries of phonological features corresponding to the phoneme; a phonological feature can extend across more than one phoneme. Several solutions to this alignment issue have been proposed. Livescu, K., and Glass, J. (2004). "Feature-based pronunciation modeling for automatic speech recognition," HLT-NAACL, Association for Computational Linguistics, 81-84.; Livescu, K., Jyothi, P., and Fosler-Lussier, E. (2015). "Articulatory feature-based pronunciation modeling," Computer Speech and Language, 36, 212-232, used graphical models allowing asynchronous and interdependent occurrence of phonological features within phonemes. King, S., and Taylor, P. (2000). "Detection of phonological features in continuous speech using neural networks," Computer Speech & Language, 14, 333-353, however, have shown that neural networks are intrinsically capable of taking care of the asynchronous behaviour of phonological features. Whilst embodiments could be arranged to follow either approach, the embodiment being described was arranged to allow the neural network take care of the asynchronous behaviour of phonological features/phonemes.

The skilled person will appreciate that the system 100 may be provided by a variety of different processing hardware. Indeed, elements of the system may be provided by hardware, software, firmware, or any combination therefore and the skilled person will appreciate the equivalence of hardware and software.

However, in the embodiment being described elements of the system are software-based and executed upon a processor based platform including at least one processor. The processor may be a processor such as an Intel® X86 processor such as an I5, I7, etc, it may be an AMD processor such as an Athlon, Sempron, etc, or the like.

The processor is arranged to communicate, via a system bus, with an I/O subsystem (and thereby with external networks, displays, and the like) and a memory.

The skilled person will appreciate that memory may be provided by a variety of components including a volatile memory, a hard drive, a non-volatile memory, etc. Indeed, the memory may comprise a plurality of components under the control of the processor.

However, typically the memory provides a program storage portion arranged to store program code which when executed performs an action and a data storage portion which can be used to store data either temporarily and/or permanently.

In other embodiments at least a portion of the system 100 may be provided remotely. In such embodiments, it is conceivable that a user may input a speech signal on a local device 500 (such as telephone, tablet (such as an iPad), or the like), and have that speech signal 108 transmitted, via a network connection 502, to a remote server 504, or servers. At least some, or perhaps all of the components, of the system 100 may be provided remote of the local device 500 used to input the speech signal 108. In such embodiments, a feedback unit 118 may be provided on the local device and receive a data signal 506 from the remote server 504 to enable feedback to be given to the L2 learner using the system.

In some embodiments, some of the components of the system 100 may be provided on the remote server(s) 504 whilst some are provided on the local device 500.

However, in the embodiment being described, the components of the system 100 are provided on a local machine.

In embodiments in which at least some of the components of the system are provided remote from the local device then a network connection (such as a 3G UMTS (Universal Mobile Telecommunication System), 4G LTE (Long Term Evolution) or WiFi (IEEE 802.11) or like) is provided between the local device and those components of the system 100 remote from the local device.

In the embodiment being described phonological features are used in the processing of the speech signal to determine what the learner has spoken (ie within the model 104, and the two neural networks 112,113) and to identify mispronunciations (i.e. deviations from the expected utterance). It is believed that phonological features provide better insights for correcting mispronunciations than phoneme or word level analysis, which in turn helps in more efficient learning. The use of phonological features can highlight pronunciation errors that cut across phonemes thereby highlighting a convenient way to locate underlying pronunciation errors. Conveniently, this identification of underlying errors can enable the system 100 to determine other (as yet un-tested) words or phonemes with which the learner is likely to make the same error, and to provide a set of training examples using this knowledge.

The output from the decoder 106 is used as an input to a further pronunciation module 110 arranged to assess whether the speech input to the input speech signal 108 has been pronounced correctly; ie the ASR 102 may be viewed as determining the contents of the speech signal 108 and the CAPT 110 may be viewed as providing feedback as to the accuracy of the learner's input to the ASR 102 via the speech signal 108. In the embodiment being described, the ASR system 102 makes an output 111 to the CAPT system 110 which informs the CAPT system 110 of the contents of the speech signal 108. In the embodiment being described, the ASR system 102 generates probability scores that various phonemes have occurred in the speech signal 108.

Mispronunciation Detection

The probability scores generated by the ASR system 102, are output 111 to the CAPT system 110, and can be used for Computer Assisted Pronunciation Training (CAPT) to assess the quality of utterances of L2 learners, where L2 is a second language. L2 learners can make three kinds of errors in pronunciations—insertions (usually vowels), deletions (both vowels and consonants) and substitutions (of phonemes). The general framework for detecting mispronunciations is based on two main components:

Acoustic model 104:
  It generates probability scores for each linguistic unit (phonological features, phoneme, etc.).
Mispronunciation detector:
  It uses the probability scores generated by the acoustic model to estimate which linguistic units are mispronounced.

Different implementations of this general framework are found in the prior art. The methods for automatic detection of substitutions and deletions, which comprise a large part of mistakes, can broadly be classified into three classes: (i) posterior probability based methods, (ii) classifier based methods, and (iii) decoding network based methods. Each of these possibilities is considered below.

Mispronunciation Correction

In addition to mispronunciation detection, a general CAPT system may also provide feedback.

The skilled person will appreciate that phonological features are the minimal, most basic, phonological unit, and that the same phonological features are present in various different phonemes, and can therefore be used to classify phonemes. In phonology, a natural class is a set of phonemes in a language that share certain phonological features. A natural class is determined by participation in shared phonological processes.

For instance, the phonological feature VOICE is relevant for the English phonemes /b d g dʒ v d z ʒ/ since this feature distinguishes them from their unvoiced counterparts /p t k tʃ f θ s ʃ/. Any error involving the de-voicing of, for instance, /b/ will probably extend to a de-voicing problem in all the other voiced phonemes, viz., /d g/ etc. This presence of these phonological features is shown in the table below which maps a small proportion of the possible phonological features against a set of possible phonemes. Likewise, other features group sounds together, for example the STRIDENT feature is shared by all phonemes that own a certain sharpness in their sound (which is high frequency noise in acoustic terms), or PLOSIVE, which stop the airstream for a short time during their production. At the same time, each phoneme is classified by a unique combination of features, which separates it from all other phonemes. For example, the phonemes /z/ and /ʒ/ are both voiced consonantal continuant obstruents, which share STRID and VOICE, but are separated by the HIGH feature.

In the following table, phonological features for some consonants are shown in the leftmost column and phonemes are shown in the top row:

|  | p | t | k | tʃ | f | θ | s | ʃ | b | d | g | dʒ | v | d | z | ʒ |
|---|---|---|---|---|---|---|---|---|---|---|---|---|---|---|---|---|
| [CONSONANTAL] | + | + | + | + | + | + | + | + | + | + | + | + | + | + | + | + |
| [OBSTRUENT] | + | + | + | + | + | + | + | + | + | + | + | + | + | + | + | + |
| [STRID] |  |  |  | + |  |  | + | + |  |  |  | + |  |  | + | + |
| [PLOSIVE] | + | + | + | + |  |  |  |  | + | + | + | + |  |  |  |  |
| [LABIAL] | + | − |  |  | + |  |  |  | + | − |  |  | + |  |  |  |
| [CORONAL] | − | + | − | + | − |  |  |  | − | + | − | + | − |  | + | + |
| [DORSAL] | − |  | + |  |  |  |  |  | − |  | + |  | − |  |  |  |
| [HIGH] |  |  |  |  |  |  |  | + |  |  |  | + |  |  |  | + |
| [CONTINUANT] |  |  |  |  | + | + | + | + |  |  |  |  | + | + | + | + |
| [VOICE] | − | − | − | − | − | − | − | − | + | + | + | + | + | + | + | + |

It can be seen that some of the phonological features are required to make the phoneme and these phonological features are highlighted with a '+'. Other phonological features must not be present and such phonological features are represented with a '−'. For some phonemes, it does not matter whether or not a third set of phonological features are present and there is no + or − against these phonological features (i.e. the corresponding cell is blank in the relevant table).

Phonological features for some vowels are shown in the leftmost column and phonemes are shown in the top row:

|           | i | I | u | ʊ | æ | a |
|-----------|---|---|---|---|---|---|
| [LABIAL]  |   |   | + | + |   |   |
| [CORONAL] | + | + | − | − | + |   |
| [DORSAL]  | − | − | + | + | − |   |
| [HIGH]    | + | + | + | + | − | − |
| [LOW]     | − | − | − | − | + | + |
| [ATR]     | + | − | + | − | + | + |

The phonological feature HIGH for vowels includes the vowels /i ɪ u ʊ/, while the phonological feature ATR (or Advanced Tongue Root) cross-classifies these HIGH vowels into /i u/. Thus /ɪ ʊ/ are not ATR although they are HIGH.

The phonological feature system of the embodiment being described assumes that if the language learner makes an error concerning the phonological feature HIGH and ATR he/she will make an error concerning both phonemes /i/ and /u/ and not just one of them.

A further implication of phonological features is that even if similar phonemes exist in two languages, the phonological features that distinguish them need not be identical because the presence of phonological features is determined by the number of phonemes that exist in the language. For instance, both English and German have the low vowel /a/ (e.g. English: father, German: 'Tag' day). However, English has another LOW vowel with a different place of articulation /æ/ (e.g. bag). To distinguish these vowels, English must mark /a/ as DORSAL while in German it is redundant.

Thus, a model based on phonological features, as used by the embodiment being described, is able to predict that phonological feature errors in one word will extend to errors in the same phonological feature in the same phoneme, and in other phonemes, in other words. If Germans speaking English are unable to voice /b/ in the word cab to distinguish it from cap, they will probably make the same voicing error in words like badge, bag, love, etc. since the error in pronunciation is generated by the same phonological feature. The prior art arranged to detect isolated phoneme errors cannot make this prediction, and therefore cannot give corrective feedback which would be an immediate effective generalisation which is believed advantageous in helping learners correct their pronunciation.

The ASR system 102 of the embodiment being described uses 18 phonological features (Table I) of the FUL model (Featurally Underspecified Lexicon, Lahiri, A., and Reetz, H. (2010). "Distinctive features: Phonological under specification in representation and processing," Journal of Phonetics, 38(1), 44-59; and Lahiri, Aditi (2012). "Asymmetric phonological representations of words in the mental lexicon," In A. Cohn et al. (eds) The Oxford Handbook of Laboratory Phonology, OUP, 146-161. Apart from these phonological features, SIL marks silence.

TABLE I

Phonological features used in this work, with the corresponding UK phonemes in ISLE dataset. See Appendix A for the corresponding IPA symbols.

| | |
|---|---|
| VOC   | (vowel) AA AE AH AO AW AX AY EH ER EY IH IY OH OW OY UH UW |
| CONS  | (consonant) B CH D DH F G HH JH K P S SH T TH V Z ZH L M N NG R |
| CONT  | (continuant fricative consonant) DH F HH L S SH TH V Z ZH |
| OBSTR | (obstruant) B CH D DH F G JH K P HH S SH T TH V Z ZH |
| STR   | (strident) CH S SH TH Z ZH |
| VOICE | (voiced consonant) B D DH G JH V Z ZH |
| SON   | (sonorant) AA AE AH AO AW AX AY EH ER EY IH IY L M N NG OH OW OY R UH UW W Y |
| STOP  | (stop consonant) B CH D G JH K P T |
| LOW   | (low) AA AE AW AY |
| HIGH  | (high) CH IH IY JH SH UH UW W Y ZH |
| LAB   | (labial) AO B F M OH OW OY P UH UW V W |
| COR   | (coronal) AE CH D DH EH EY IH IY JH L N R S SH T TH Y Z ZH |
| DOR   | (dorsal) AA AO AW AY G K NG OH OW OY UH UW W |
| RTR   | (retracted tongue root vowel) AH AX EH ER IH UH W |
| NAS   | (nasal) M N NG |
| LAT   | (lateral) L |
| RHO   | (rhotic) ER R |
| RAD   | (radical) HH |

Various non-native speech datasets have been collected by different research groups (Raab, M., Gruhn, R., and Noeth, E. (2007). "NON-NATIVE SPEECH DATABASES," in Proceedings of ASRU) and can be used to evaluate CAPT systems. The embodiment being described herein has been assessed using the Interactive Spoken Language Education (ISLE) corpus (Menzel, W., Atwell, E., Bonaventura, P., Herron, D., Howarth, P., Morton, R., and Souter, C. (2000). "The ISLE corpus of non-native spoken English," in Proceedings of LREC, pp. 957-963), which contains noise-free utterances by learners of English, who read sentences in English. The database contains data from German and Italian native speakers, 23 of each language. The data is divided into two non-overlapping sets—one for training and the other for testing.

The training data consists of 19 speakers from each language, with total audio duration of 8 hours 25 minutes. The test data consists of 4 speakers from each language and a total audio duration of 1 hour 34 minutes captured in a series of audio files. The speakers for the training and test data do not overlap.

Each audio file, which can be used to generate the speech signal 108, consists of a single sentence and is annotated at word and phoneme levels, where the phonemes are from the UK English phoneme set. The correspondence between phoneme symbols used in ISLE dataset and the International Phonetic Alphabet (IPA) symbols is given in the table below:

| AA | ɑː | EH | ɛ  | L  | l  | SH | ʃ  |
|----|----|----|----|----|----|----|----|
| AE | æ  | ER | ɜː | M  | m  | T  | t  |
| AH | ʌ  | EY | eɪ | N  | n  | TH | θ  |
| AO | ɔː | F  | f  | NG | ŋ  | UH | ʊ  |
| AW | aʊ | G  | g  | OH | ɔ  | UW | uː |
| AX | ə  | HH | h  | OW | oʊ | V  | v  |
| AY | aɪ | IH | ɪ  | OY | oɪ | W  | w  |

-continued

| B | b | IY | i: | P | p | Y | J |
| CH | tʃ | JH | dʒ | R | r | Z | z |
| D | d | K | k | S | s | ZH | ʒ |
| DH | ð | | | | | | |

Each column in the table shows a UK phoneme (left) with the corresponding IPA symbol (right).

Several phonemes that do not match any UK phoneme (due to mispronunciations), are denoted as 'unmap'; ie if there was mis-pronunciation in the audio being transcribed. Phoneme level transcriptions comprise two levels: intended or target phonemes and actually uttered phonemes. The target phonemes correspond to the canonical transcription of the words in the sentence, while the actually uttered phonemes are manually transcribed by expert language teachers, who listened to these utterances. For example, for the word said, the target utterance is /s ɛ d/ (eg the English word said as used as an example in FIG. 2), and if the learner pronounced an incorrect vowel, it will be transcribed as /s eɪ d/. The two phoneme transcriptions are time-synchronised (which may also be referred to as force aligned) and hence, it is easy to label the target transcriptions with binary mispronunciation markers (i.e., correct or not). In addition, each speaker is also rated for pronunciation proficiency, on a 5-level scale. Of course, other embodiments may use different scales.

Experimental Evaluation

To quantitatively assess the performance of the phonological feature extraction system of the embodiment being described, its precision, recall and F-measure were analysed. Precision is defined as the number of true detections divided by the total number of detections, and recall is defined as the number of true detections divided by the number of actual occurrences. F-measure is the harmonic mean of precision and recall. The performance of the phonological feature extraction system is shown in Table II. These values are evaluated frame-wise, using different detection thresholds for each phonological feature. Presence of a phonological feature denotes the number of frames having that phonological feature divided by the total number of frames in the test set.

TABLE II

Evaluation of phonological feature estimation
Presence denotes the frequency
of occurrence of the feature in the test set.
Precision, recall and F-measure are defined in
the text. All values at in % ge.

| Feature | Presence | Precision | Recall | F |
|---|---|---|---|---|
| VOC | 20.9 | 88.4 | 80.4 | 84.2 |
| CONS | 30.0 | 87.1 | 86.4 | 86.8 |
| CONT | 11.7 | 71.9 | 83.6 | 77.3 |
| OBSTR | 21.8 | 86.9 | 88.1 | 87.5 |
| STR | 7.4 | 84.7 | 87.5 | 86.0 |
| VOICE | 6.3 | 51.4 | 58.8 | 54.9 |
| SON | 31.3 | 92.8 | 91.5 | 92.1 |
| STOP | 11.8 | 79.5 | 79.9 | 79.7 |
| LOW | 2.3 | 56.1 | 44.9 | 49.9 |
| HIGH | 8.4 | 68.0 | 74.0 | 70.9 |
| LAB | 10.9 | 67.3 | 68.4 | 67.8 |
| COR | 29.6 | 87.7 | 77.2 | 82.1 |
| DOR | 12.1 | 75.9 | 67.1 | 71.2 |
| RTR | 8.0 | 60.2 | 54.4 | 57.1 |
| NAS | 4.7 | 76.0 | 71.7 | 73.8 |
| LAT | 1.7 | 48.2 | 38.0 | 42.5 |
| RHO | 3.3 | 56.5 | 44.9 | 50.1 |

TABLE II-continued

Evaluation of phonological feature estimation
Presence denotes the frequency
of occurrence of the feature in the test set.
Precision, recall and F-measure are defined in
the text. All values at in % ge.

| Feature | Presence | Precision | Recall | F |
|---|---|---|---|---|
| RAD | 0.6 | 38.5 | 60.0 | 46.9 |
| SIL | 47.0 | 97.0 | 97.3 | 97.1 |

IV. Mispronunciation Detection

In a typical Computer Aided Language Learning (CALL) application, a learner is given a sentence to read, where the target sequence of phonemes is known from the dictionary. The task of the program is to detect the mistakes in pronunciations made by the learner. The mistakes can be substitutions, deletions and/or insertions of phonemes. Thus, in the embodiment being described, the speech signal 108 represents the learner's attempt to utter the target sequence of phonemes and it is the aim of the CALL to provide feedback as to whether the correct phonemes are present, whether some phonemes are absent, and/or whether extra phonemes are present Here it is noted that conceptually, phonemes are easier for a learner to comprehend, and provide feedback with whereas typically a learner will be unaware of phonological features that they are using to generated the spoken phonemes. However, it has been found advantageous to use phonological features to determine pronunciation problems, which problems may occur across a plurality of different phonemes if a learner cannot correctly sound a given phonological feature.

For detecting substitutions and deletions, the embodiment being described implements two methods, one of which is posterior based and uses the GOP measure, while the other is classifier based and uses a NN 112 classifier. For detecting insertions, the decoding Finite State Transducers 117 (FSTs) are modified to allow insertions by introducing filler models and this is described below with reference to FIG. 2 above.

Here, the skilled person will appreciate that posterior probability based methods define some measure using the probability scores of phonemes estimated by the ASR acoustic model 104. These probability scores are obtained by force-aligning the learner's speech with the target phoneme sequence of the sentence, which the learner intends to utter. Since the measure is mostly scalar, a simple threshold can be defined so as to detect a mispronunciation. A widely used measure is the goodness of pronunciation (GOP) measure Witt, S. (1999). "Use of speech recognition in computer assisted language learning," Ph.D. thesis, University of Cambridge, Cambridge, UK).

An advantage of using the GOP measure is that it does not require explicit training for mispronunciation detection and instead, the posterior probabilities obtained from the ASR acoustic model can directly be used to detect mispronunciations.

A. GOP Measure

Given the acoustic parameters $o_t$ at each time frame t, the average value of phoneme posterior probability for each phoneme p over segment i is obtained as $$\log P(p|i) = \frac{1}{T_i} \sum_{t=t_i^0}^{T_i} \log P(p|o_t) \quad (1)$$

Here, $t_i^o$ and Ti denote the start time and duration of the segment i, respectively, and are obtained from the forced alignments. In the embodiment being described, each segment is intended to correspond to a single phoneme, and the forced alignment determines when one segment (i.e. phoneme) ends and the next starts.

While the acoustic model returns probability of states at each time frame, $P(p|o_t)$ is estimated as the maximum probability among those of the states belonging to phoneme p. Then, the GOP measure for the target phoneme $p_i$ is defined as:

$$GOP(p_i | i) = \log \frac{P(p_i | i)}{\max_{q \neq p_i} P(q | i)} \quad (2)$$

A low value of the GOP measure entails a low probability of the target phoneme $p_i$ as compared to other phonemes, as judged by the acoustic model, and hence, a low quality of pronunciation. A threshold can be set on the GOP measure to detect mispronunciation.

In the embodiment being described, a different threshold is set for each phoneme which threshold is learned statistically using the training data, using simple logistic regression. However, in other embodiments it would be equally possible to set a common threshold for each phoneme.

Classifier Based Measure

Given the target sequence of phonemes to be spoken and the speech signal uttered by the learner, the mispronunciation detector is arranged to decide which phonemes are correctly pronounced and which ones are incorrectly pronounced by the learner. As described, elsewhere, the embodiment being described uses phonological features to make this analysis. Hence, the mispronunciation detector 110 produces a scalar output corresponding to the score that a phoneme is correctly pronounced. First of all, the learner utterance is force-aligned to the target phoneme sequence with the help of the DNN based acoustic model 104. The probability scores obtained from the acoustic model 104 are then processed to form the input to the mispronunciation detector 110.

In the embodiment being described, the mispronunciation detector 100 comprises a NN 116 with one hidden layer of 500 neurons with ReLU non-linearity. The reason for avoiding more hidden layers is primarily the unavailability of large data for training them. Furthermore, several researchers (such as Li, W., Siniscalchi, S. M., Chen, N. F., and Lee, C.-H. (2016), "Improving non-native mispronunciation detection and enriching diagnostic feedback with DNN-based speech attribute modeling," in Proceedings of ICASSP, pp. 6135-6139; and Hu, W., Qian, Y., Soong, F. K., and Wang, Y. (2015). "Improved mispronunciation detection with deep neural network trained acoustic models and transfer learning based logistic regression classifiers," Speech Commun., 67, pp. 154-166) have obtained their best performance with a single hidden layer. However, the skilled person will appreciate that more hidden layers may be provided, particularly if more training data is available train that larger network.

The input to the detector NN 116 is prepared as follows. The average values of phonological feature probabilities are obtained for each phoneme segment.

$$P(f | i) = \frac{1}{T_i} \sum_{t=t_i^o}^{T_i} P(f | o_t) \quad (3)$$

Here, $t_i^o$ and $T_i$ denote the start time and duration of the phoneme states, respectively, and are obtained from the forced alignments. Since, each phonological feature is modelled with 3 states (present; absent; not specified, as described below the input to the NN 116 consists of three such vectors of Eq. 3 concatenated together. Embodiments that utilise these three values for the presence of a phonological feature have been found to efficiently allow pronunciation errors to be fed back to a learner.

The output of the NN 116 is denoted as $P(p|t_p^o)$, where p is the target phoneme starting at time $t_p^o$. The number of neurons in the output layer is equal to the total number of phonemes in English (as defined in the dataset for transcriptions). Each neuron has sigmoid non-linearity to restrict the output between 0 and 1. Output 0 denotes mispronunciation and 1 signifies correct pronunciation. The phoneme p in the target transcription is detected to be mispronounced if $P(p|t_p^o) < \varepsilon$, with $\varepsilon$ being a scalar threshold, which is set as same for all phonemes. Note that only the $p^{th}$ output of the NN is used, while the rest are not. It is also possible to use different threshold values for different phonemes. In this architecture, all the phonemes have a shared hidden layer. This allows for improvement in the performance in the face of scanty training data as different phonemes benefit by mutual sharing of statistical properties.

The benefit of shared representations has also been empirically observed by Hu et al. (2015), supra.

Training

For the input corresponding to target phoneme $p_i$, the desired output of the NN 116 at the $p_i$th neuron is set to 0 or 1, for incorrect or correct pronunciation, respectively. In order to estimate the ground truth for training, the speech utterance is force-aligned with the actually uttered phoneme sequence. If the aligned segment of the target phoneme overlaps more than 50% with the same phoneme in the actually uttered alignments, it is marked as correctly pronounced. However, if the overlap is less than 10%, it is marked as incorrect pronunciation. Stochastic gradient descent is used to update the weights of all the layers by minimising the squared error objective function. While computing the weight update for the phoneme $p_i$, an important issue for the shared classifier is to determine the desired output for other phonemes. In the embodiment being described, the error feedback from output neurons corresponding to other phonemes is set to 0.

In the embodiment being described, errors are assessed in the following way:
- a correct pronunciation (a 'hit') is counted if the (hand-labelled) phoneme is the same as the one that the program computes; and
- an incorrect pronunciation/pronunciation error (a 'miss') is counted if the overlap is less than 10%.

In this embodiment, overlaps in the range between 10% and 50% are not counted as correct or incorrect because the forced alignment is not expected to determine 'exact' boundaries between phonemes, and, in natural speech, the border between two sounds is blurred and not as clear as it is in letters in a typed text. Certainty of overlaps in this range being correctly identified as either hits or misses would therefore be low—not counting them reduces the risk of incorrect judgment. The skilled person will appreciate that this middle range may differ (e.g. 20% to 40%), or may not be present, in other embodiments.

Another consideration is that of unbalanced data; eg unevenly distributed data. In order to deal with the uneven distribution of data over phonemes, apart from using a shared NN, a two-stage training scheme is used for the NN classifier. In the first stage, all the layers are trained together. In the second stage, only the output layer is trained, while keeping the hidden layer as fixed. In the embodiment being described, there was little data, which is unevenly distributed over different phonemes, and so the first step provides shared learning of layers, while the second step tunes the output for individual phonemes.

But even for the same phoneme, the number of correct and incorrect pronunciations can be heavily unbalanced. A sample weighting was adopted to deal with this, i.e., the output error value used for updating the NN is weighted using the data size for each class. The output error for each class (0 or 1) of phoneme $p_i$ is weighted with the inverse ratio of the number of samples available for training each class.

Implementation and Experimental Evaluation

The test utterances of the ISLE database are analysed with the methods proposed above. The ground truth is prepared using the target phoneme sequences and the actually uttered phoneme sequences. The ground truth substitution, deletion and insertion errors are found by aligning these two sequences using the Levenshtein distance.

Errors were analysed in terms of two classes—one for substitution and deletion errors, and another for insertion errors. Since these two classes are handled by different methods, they were evaluated independently.

Substitution and Deletion

Figure 3:
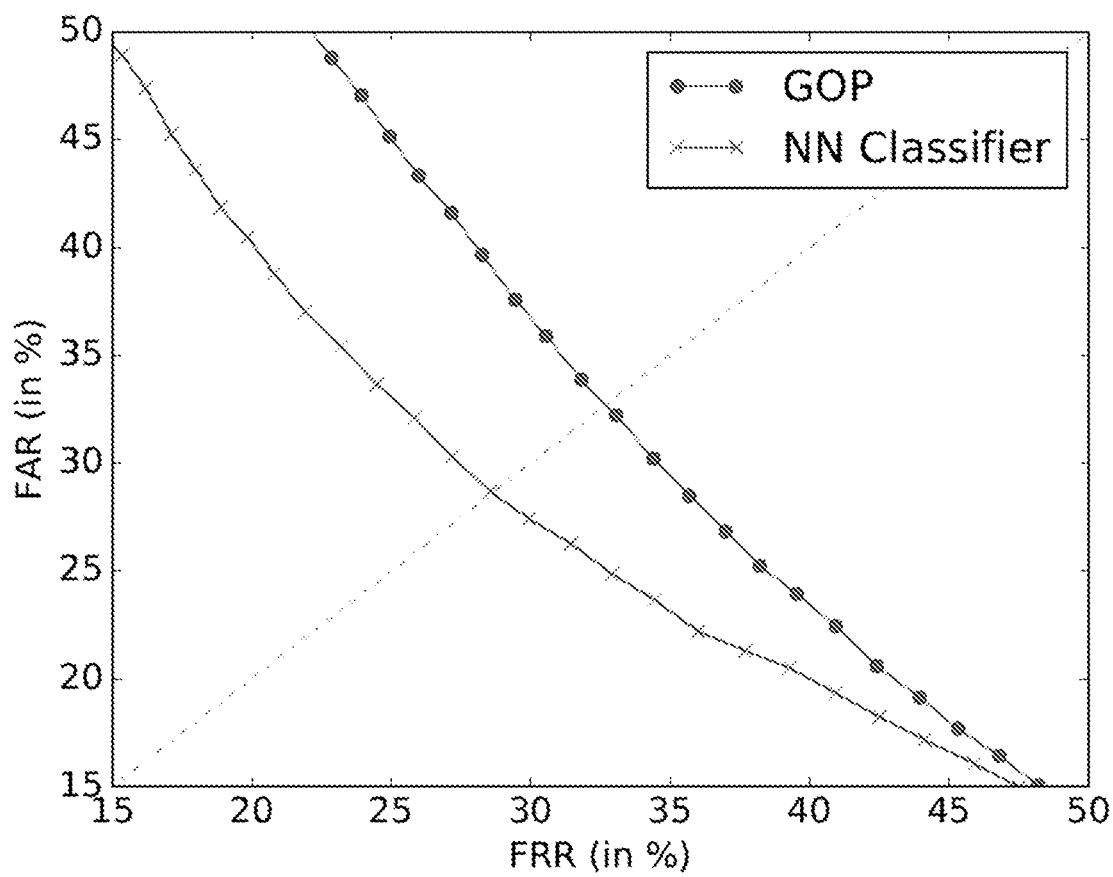
FIG. 3 shows a Receiver Operating Characteristic (ROC) for substitution and deletion errors, for the embodiment being described, over the test set where Equal Error Rate (EER) for Goodness Of Pronunciation (GOP) based scheme is 32.7%, while that for a Neural Network (NN) classifier is 28.6%.

To evaluate the performances of GOP-based and NN-based schemes over the test data, each phoneme uttered by the speaker is classified into correct or incorrect pronunciation, and the performance is measured in terms of false rejection rate (FRR) and false acceptance rate (FAR). Since they vary in opposite directions with a threshold, the performance measure is generally set as the equal error rate (EER), at which FRR and FAR are equal. FIG. 3 shows the receiver operating characteristic (ROC) curves for substitution and deletion errors in pronunciation. It can be seen that the NN classifier based system performs better than the GOP based system, achieving a lower EER.

performance of insertion detection is independent of the performance of substitution and deletion detection. Since the filler can insert phonemes at any word boundary, its performance is measured in terms of precision and recall. The two can be varied by changing the filler probability $P_{ins}$.

TABLE IV

Evaluation of insertion detection over the test set, as a function of $P_{ins}$, recall and F-measure have been defined in the text, and are in % ge.

| $P_{ins}$ | Precision | Recall | F |
|---|---|---|---|
| 1.0 | 25.6 | 70.8 | 37.6 |
| 0.9 | 26.3 | 67.2 | 37.8 |
| 0.8 | 28.1 | 65.0 | 39.2 |
| 0.7 | 29.5 | 60.9 | 39.7 |
| 0.6 | 31.4 | 56.8 | 40.4 |
| 0.5 | 34.9 | 54.5 | 42.5 |
| 0.4 | 37.3 | 49.9 | 42.7 |
| 0.3 | 40.5 | 42.3 | 41.4 |
| 0.2 | 44.5 | 35.0 | 39.2 |
| 0.1 | 50.0 | 26.1 | 34.3 |
| 0.01 | 61.5 | 12.2 | 20.4 |

Table IV shows the performance of insertion detection as the filler probability is varied. It is observed that a lower value of $P_{ins}$ inhibits insertions, thereby, lowering the recall and increasing precision. Changing $P_{ins}$ affects the decoded phoneme boundaries, and consequently, the performance of substitution and deletion detector as well; but, this affect was found to be negligibly small (<0.2%). The results of all other analyses have been reported with $P_{ins}=1$.

Table V analyses the performance of insertion detection for most frequently inserted phonemes. The phoneme that is inserted most often is /AX/. These come predominantly (>99% times) from Italian speakers, who, tend to insert a schwa after word-final consonants. Predictably, /G/ is inserted by Italian speakers after /NG/, /EH/ is inserted around vocalic or rhotic phonemes, and /HH/ around silence.

TABLE III

Phoneme-wise analyses of substitution and deletion detection over the test set. Presence denotes the substitution or deletion frequency of the target phoneme in the test set w.r.t. that of all target phonemes. FAR and FRR have been defined in the text. Caught and Missed, respectively, denote the best caught and missed phoneme substitutions, in the decreasing order of their share (given in parenthesis) among total mispronunciations of the target phoneme; '—' denotes deletion. All values are in % ge.

| Phoneme | Presence | FAR | FRR | Caught | | | | | | Missed | | | | | | |
|---|---|---|---|---|---|---|---|---|---|---|---|---|---|---|---|---|
| AX | 12.9 | 42.6 | 35.0 | OH | (18.4) | — | (9.0) | UH | (8.2) | EH | (8.4) | UH | (5.5) | AH | (3.7) |
| IH | 9.4 | 46.4 | 20.7 | IY | (56.6) | AX | (6.3) | — | (5.5) | IY | (12.5) | AX | (2.7) | — | (2.3) |
| T | 7.6 | 20.6 | 27.2 | — | (53.5) | D | (8.4) | AH | (3.0) | — | (17.0) | AH | (2.9) | D | (2.4) |
| DH | 6.6 | 36.8 | 31.2 | D | (51.5) | — | (8.5) | TH | (4.0) | D | (19.8) | — | (5.6) | V | (3.3) |
| R | 6.2 | 36.2 | 29.5 | unmap | (55.0) | — | (10.1) | AX | (1.8) | unmap | (26.5) | — | (1.8) | OH | (0.6) |

Table III provides further analyses of system performance for the top five substituted/deleted phonemes. Among all phoneme substitutions/deletions (total 2661), /AX/ has the top share (12.9% or 343 times). Out of all these mispronunciations of /AX/, 8.2% of times (28 times) it is substituted with /UH/ and is caught by the system, while 5.5% of times (19 times) it is substituted with /UH/ and escapes uncaught from the system. When /R/ is mispronounced in a non-British fashion, it is labelled as 'unmap'.

Insertion

Insertions are dealt with while decoding, with the help of the filler model as described in relation to FIG. 2. Hence, the

TABLE V

Phoneme-wise analysis of insertion detection over the test set of $P_{ins} = 0.4$. Presence denotes the frequency of insertion of the phoneme in the test set. Precision, recall and F-measure have been defined in the text. All values are in % ge.

| Phoneme | Presence | Precision | Recall | F |
|---|---|---|---|---|
| AX | 54.4 | 98.1 | 56.6 | 71.8 |
| unmap | 6.6 | 100.0 | 44.8 | 61.9 |

TABLE V-continued

Phoneme-wise analysis of insertion
detection over the test set of $P_{ins} = 0.4$.
Presence denotes the frequency of insertion of
the phoneme in the test set. Precision, recall
and F-measure have been defined in the
text. All values are in % ge.

| Phoneme | Presence | Precision | Recall | F |
|---|---|---|---|---|
| G | 4.6 | 50.0 | 20.0 | 36.7 |
| EH | 4.4 | 22.2 | 26.7 | 24.2 |
| HH | 3.7 | 57.5 | 92.0 | 70.8 |

Mispronunciation Feedback

Figure 4:
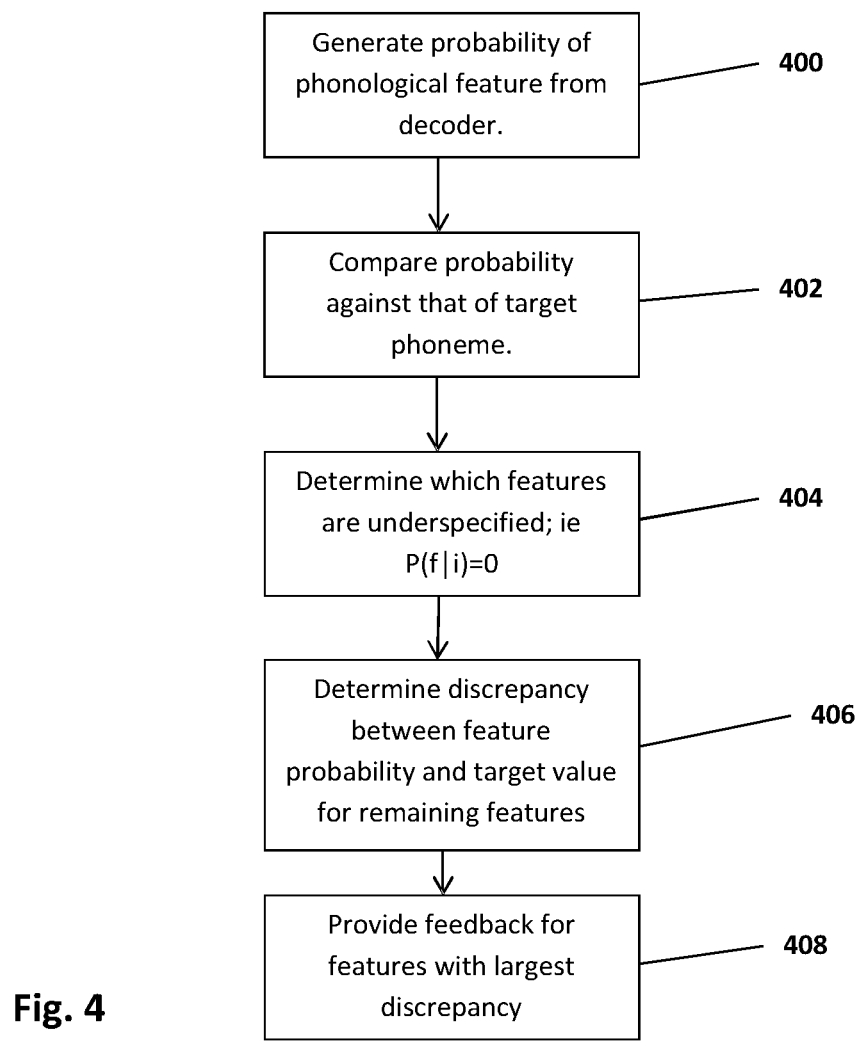
FIG. 4 shows a flow chart outlining operation of an embodiment.
Figure 5:
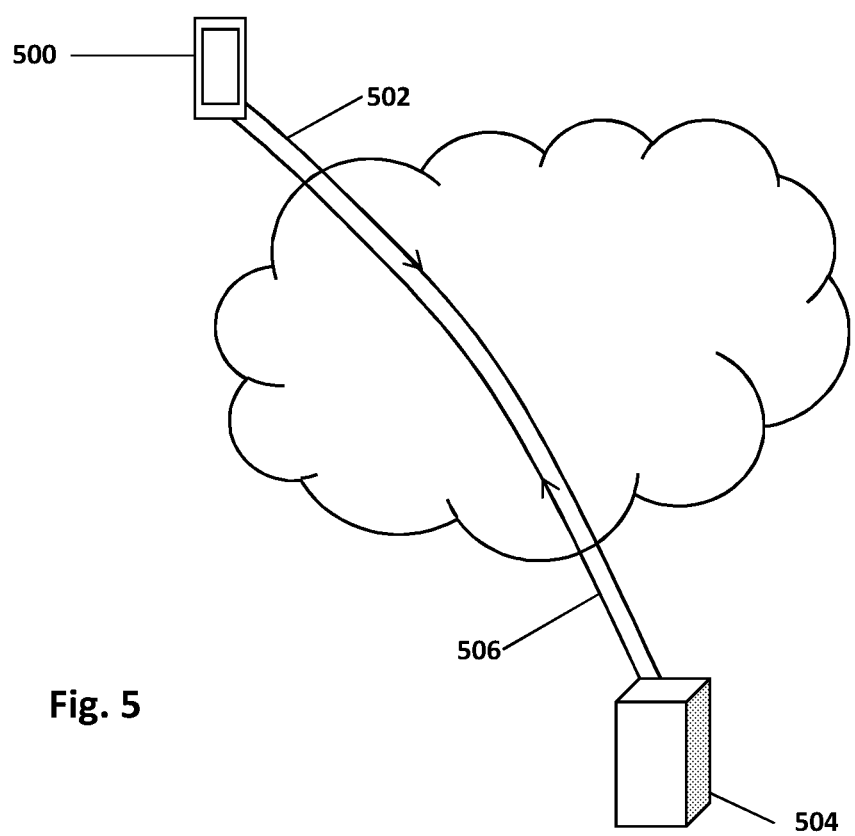
FIG. 5 shows an arrangement of one embodiment.

It will be seen from above that the decoder 106 generates a probability against each of a number of phonological features appearing in the phrase uttered by the learner. This is shown as step 400 in FIG. 4.

For mispronunciation feedback, the estimated values of phonological features were used (ie the probabilities output from the decoder) and comparison (step 402) was made with the corresponding target value associated with that feature of the corresponding target phoneme (ie within the phrase that the leaner was asked to speak). This gives us the extent of the deviation of each phonological feature from its target value, and hence a measure of whether or not the target phoneme was correctly pronounced, and what was wrong if not.

Based on the FUL model, a prediction can be made as to which phonological features are not crucial for a particular target phoneme (step 404), due to under specification, i.e., if a phonological feature is underspecified its mispronunciation is tolerated. For example, if rainbow (/r aI n b aʊ /) is pronounced as /r aI m b aʊ/, it is not considered a mispronunciation, since the phonological feature COR is underspecified. Here the 'n' has been substituted for an 'm' which is not significant in the pronunciation of the word 'rainbow'.

Thus, it is then possible to calculate a discrepancy between the uttered phonological feature and the target phonological feature in the phrase that the learner was trying to speak (step 406).

The system 100 can be arranged to identify the phonological feature with the strongest deviation as the one that needs to be corrected first (408). This can then be used to construct a feedback in terms of articulation for easy comprehension of the learner.

It is known that a given phonological feature may appear in a plurality of phonemes. As such, a learner may be given a plurality of seemingly different phonemes, each of which contains the mispronounced phonological feature. Such embodiments are believed to help a learner by giving him/her a variety of different learning examples.

Implementation

The average value of a phonological feature f over segment i is given as $$P(f \mid i) = \frac{1}{T_i} \sum_{t=t_i^0}^{T_i} P(f \mid o_t) \quad (4)$$

Let the target value of phonological feature f for target phoneme $p_i$ be given by $g(f|p_i)$. Based on the FUL model, $g(f|p_i)$ can take one of the three values $\{+1, 0, -1\}$, where +1 signifies that the phonological feature f must be present, i.e., P(f|i) should be close to 1; −1 implies that the phonological feature f should be absent, i.e., P(f|i) should be close to 0; and 0 entails unspecified value of f, i.e., the value of P(f|i) is not important for correct pronunciation of target phoneme $p_i$ (the presence or absence of the phonological feature can therefore be treated as not specified for target values of 0). The extent of deviation is measured as:

$$D(f \mid i) = \begin{cases} 1 - P(f \mid i) & \text{if } g(f \mid p_i) = +1 \\ P(f \mid i) & \text{if } g(f \mid p_i) = -1 \\ 0 & \text{if } g(f \mid p_i) = 0 \end{cases} \quad (5)$$

The phonological feature $f^* = \mathrm{argmax}_f |D(f|i)|$ is identified as the phonological feature to be used for constructing corrective feedback. The skilled person will appreciate that the phonological feature with the largest deviation may be the most important one to correct, and hence be selected in this way, but that different embodiments may provide feedback on all mispronunciations with a deviation greater than a threshold, or on the top two, or the likes. Further, the system 100 may provide a learner-controlled option so a learner can select how many, and how large, deviations are selected for feedback. The sign of $D(f^*|i)$ determines the direction of change, namely, a positive sign implies that phonological feature $f^*$ needs to be increased, and a negative sign implies that it should be decreased. To improve the feedback using certain simple phonological observations, before determining $f^*$, the estimated D(f|i) is processed as follows:

(i) since the phonological features VOC, SON, VOICE have similar properties and they all correspond to some form of resonance, they can, in some embodiments, be merged for constructing feedback;

(ii) D(f|i) for SIL is made 0, since it is not relevant for feedback.

Experimental Evaluation

The ground truth for the test utterances is prepared using the ground truth of the target and actually uttered sequences, which have been aligned using minimum Levenshtein distance. The target value of a phonological feature f for the target phoneme $p_i$ is given by $g(f|p_i)$ and the corresponding value for the actually uttered phoneme $q_i$ is given by $g(f|q_i)$. The ground truth feedback for the phonological feature f is simply $g(f|p_i)-g(f|q_i)$. If the sign (+,−, or 0) of estimated $D(f^*|i)$ matches with that of $g(f^*|p_i)-g(f^*|q_i)$, it is considered to be a correct feedback. The accuracy of feedback is defined as the number of times the feedback is correct divided by the total number of times a feedback is rendered, and is evaluated phonological feature-wise (Table VI) as well as phoneme-wise (Table VIII).

Phonological feature-wise accuracy is measured over the total number of times a particular phonological feature was given as feedback, while phoneme-wise accuracy is measured over the total number of times a particular target phoneme was mispronounced. All these evaluations are performed over actual mispronunciations, and not the estimated ones, so as to evaluate the feedback system alone.

TABLE VI

Feature-wise evaluation of Feedback Accuracy over the test set. Attempts denote the number of times that feature was given as feedback. Accuracy has been defined in the text and is in % ge.

| Feature | Attempts | Accuracy |
|---|---|---|
| CONS | 68 | 47.1 |
| CONT | 154 | 94.8 |
| OBSTR | 41 | 68.3 |
| STR | 41 | 85.4 |
| VOICE | 237 | 61.6 |
| SON | 12 | 100.0 |
| STOP | 189 | 93.7 |
| LOW | 141 | 95.0 |
| HIGH | 207 | 79.2 |
| LAB | 173 | 61.8 |
| COR | 249 | 72.3 |
| DOR | 101 | 78.2 |
| RTR | 833 | 70.2 |
| NAS | 25 | 100.0 |
| LAT | 5 | 100.0 |
| RHO | 166 | 95.2 |
| RAD | 19 | 100 |
| All | 2061 | 76.4 |

TABLE VII

Feature-wise analyses of feedback accuracy over the test set. Feature in 1st column denotes the feature selected for feedback. Phonemes in later columns are target phonemes (their share is in parenthesis: "—" denotes deletion. All values are in % ge.

| Feature | Correct Feedback | | Incorrect Feedback | |
|---|---|---|---|---|
| CONS | R (32.4) | EY (10.3) | EY (35.3) | AX (4.4) |
| LOW | AE (72.3) | AY (10.6) | AE (4.3) | AY (0.7) |
| HIGH | IH (25.6) | IY (24.2) | IY (14.0) | UW (2.9) |
| VOICE | Z (29.5) | S (12.6) | D (11.8) | Z (10.6) |
| LAB | OH (26.8) | OW (11.6) | OW (23.7) | UW (5.2) |
| RTR | AX (23.9) | IH (22.9) | AX (16.4) | AH (10.8) |

The phonological feature-wise accuracy is analysed further in Table VII for some of the phonological features with low accuracies and large number of attempts. For example, the phonological feature RTR is selected as feedback 833 times; out of this, 70.2% times (585 times) it is correct. Out of all the RTR feedbacks, 23.9% times (199 times) it is for the phoneme /AX/ and is correctly rendered (this adds to the correct feedbacks), while 16.4% times (137 times) it is for the same phoneme /AX/ but is not relevant for correcting those mispronunciations (hence, it adds to the incorrect feedbacks).

TABLE VIII

Phoneme-wise evaluation of Feedback Accuracy over the test set. The number in bracket after each phoneme is the number of times that target phoneme has been mispronounced. Accuracy has been defined in the text and is in % ge.

| Phoneme | Accuracy |
|---|---|
| AA (27) | 100.0 |
| AE (156) | 96.2 |
| AH (165) | 42.4 |
| AO (25) | 52.0 |
| AW (7) | 100.0 |
| AX (343) | 58.3 |
| AY (20) | 85.0 |
| B (10) | 60.0 |
| CH (10) | 80.0 |
| D (77) | 63.6 |
| DH (176) | 85.8 |
| EH (107) | 80.4 |
| ER (60) | 85.0 |
| EY (132) | 43.9 |
| F (4) | 25.0 |
| G (8) | 87.5 |
| HH (26) | 100.0 |
| IH (251) | 97.2 |
| IY (87) | 59.8 |
| JH (15) | 46.7 |
| K (36) | 97.2 |
| L (6) | 100.0 |
| M (2) | 50.0 |
| N (25) | 100.0 |
| NG (7) | 100.0 |
| OH (82) | 89.0 |
| OW (81) | 35.8 |
| OY (4) | 100.0 |
| P (6) | 83.3 |
| R (166) | 99.4 |
| S (56) | 87.5 |
| SH (5) | 60.0 |
| T (202) | 91.6 |
| TH (16) | 100.0 |
| UH (42) | 100.0 |
| UW (44) | 59.1 |
| V (38) | 55.3 |
| W (8) | 100.0 |
| Y (25) | 100.0 |
| Z (103) | 73.8 |
| ZH (1) | 100.0 |
| All (2661) | 76.4 |

Similarly, the phoneme-wise accuracy is also analysed in Table IX for certain target phonemes with low accuracies. For instance, out of all the mispronunciations of /EY/ (132 times) as the target phoneme, 24.2% times (32 times) it is substituted with /AX/, where 21.2% times (28 times) the system renders correct feedback and 3.0% times (4 times) it fails to identify the phonological feature which needs to be corrected.

TABLE IX

Phoneme-wise analysis of feedback accuracy over the test set. Phoneme in 1st column is the target phoneme Phonemes in later columns are those actually uttered (their share is in parenthesis); "—" denotes deletion. All values are in % ge.

| Phoneme | Correct Feedback | | Incorrect Feedback | |
|---|---|---|---|---|
| AE | EH (35.9) | AH (24.3) | AA (33.8) | — (0.0) |
| IH | IY (68.1) | AX (8.0) | IY (1.2) | AX (1.2) |
| AH | AA (12.7) | — (7.9) | AX (52.1) | UH (3.6) |
| EY | AX (21.2) | — (13.6) | EH (47.7) | AX (3.0) |
| IY | AX (10.9) | — (6.1) | IH (75.1) | Y (2.2) |
| OW | unmap (23.5) | — (6.2) | OH (51.9) | AO (11.1) |

From tables VI-IX, the effectiveness of phonological feature based analysis can be seen. With these 18 phonological features it is possible to construct the 41 phonemes in this case and the same phonological features are able to model the phoneme sets of many other languages, including phonemes that are not in English as in the embodiments being described herein. For example, a set of nasal vowels are simply modelled by adding a NAS phonological feature to the oral vowels. Furthermore, the phonological features that are well diagnosed by the system predict good diagnosis of corresponding phonemes. For instance, the phonological features NAS, RAD, RHO, LAT have high scores (Table VI) and it was found that the phonemes corresponding to these phonological features also perform well (see Table VIII). Consequently, improving the performance of one phonological feature will have an immediate effect on related phonemes. At the same time, the system gains from the under specification of phonological features for many phonemes: a decrease of Type I errors does not necessarily lead to an increase of Type II errors, and vice versa.

While these results well support the effectiveness of the embodiment being described, there may be some avenues for improvement. Table VIII shows that diphthongs /AO, EY, OW/ perform less well. In the embodiment being described, each diphthong was assigned with the phonological features of the first phoneme for simplification. This simplification in the utilised model leads to some errors in diagnosis. Other embodiments may therefore model a diphthong as a sequence of two phonemes which may well help to alleviate these errors.

A phonological feature based CAPT system may also be used to predict the L1 (ie native language) phonological system. If, for instance, the learners make consistent errors with differentiating strident fricatives from others, then it could be concluded that their L1 does not have this contrast. Conversely, if the learners are good at distinguishing voicing contrast in all word positions, their L1 may well allow for voiced and voiceless consonants everywhere. Embodiments may be arranged to use this information to customise the system to specific L1 learners. Since embodiments are phonological feature based, it could be extended to other languages, even if their phoneme system is not identical.

Thus, a further advantage of using phonological features is that it allows the system to capture mistakes without modelling the phonemes that are not present in L2, as the phonological features can themselves cover a broad range of possible phonemes. In many instances, learners cut across several phonemes in making errors. For instance, a frequent error in voicing involves incorrectly producing /s/ instead of /z/ in English words such as grades, bags etc. A useful feedback for the learner is to point out that words ending with a voiced consonant will always take a voiced plural ending. Thus, a phonological feature based CAPT system which provides learners with feedback based on phonological feature errors, has many positive consequences.

The invention claimed is:

1. A computer implemented method for automatic speech analysis comprising:
    setting a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified;
    receiving a speech signal, wherein the speech signal comprises a user's attempt to say the target phrase;
    analysing the speech signal to determine phonological features present within a portion of the speech signal corresponding to the target phoneme and assigning a probability to each of the set of phonological features;
    comparing a probability assigned to each phonological feature based on the speech signal to the target value of that phonological feature within the target phrase;
    determining a deviation from the comparison; and
    outputting the deviation to provide feedback on the closeness of the speech signal to the target phrase.

2. The method according to claim 1 utilising an Automatic Speech Recognition (ASR) system to determine the phonological features present within the speech signal, and wherein optionally the determination of the ASR is output to a further system arranged to determine the deviation and generate feedback.

3. The method according to claim 2 in which the ASR is arranged to generate probabilities of the set of phonological features being present within the speech signal.

4. The method according to claim 2 in which the ASR uses a neural network arranged to output a vector representing the phonological features found within the speech signal.

5. The method according to claim 2 in which the ASR uses a Hidden Markov Model (HMM) to determine which of the three values of present, absent, or not specified each of the phonological features should take.

6. The method according to claim 2 in which the ASR outputs to a CAPT (Computer Aided Pronunciation Training) module comprising a further neural network.

7. The method according to claim 6 in which the further neural network outputs whether mispronunciation has occurred of any of the phonological features.

8. The method according to claim 1 in which the speech signal is force aligned with the target phrase.

9. The method according to claim 1 which accepts a speech signal having an expected set of phonemes present therein.

10. The method according to claim 1 which determines the actual phonemes present in the speech signal, optionally using a Finite State Transducer (FST).

11. The method according to claim 9 wherein the speech signal includes words and wherein the phonemes from the expected set of phonemes are inserted at boundaries between the words.

12. The method according to claim 1, wherein the deviation is a deviation D(f|i), determined as:

$$D(f|i) = \begin{cases} 1 - P(f|i) & \text{if } g(f|p_i) = +1 \\ P(f|i) & \text{if } g(f|p_i) = -1 \\ 0 & \text{if } g(f|p_i) = 0, \end{cases}$$

wherein $g(f|p_i)$ is the target value for the phonological feature f of the target phoneme $p_i$ and P(f|i) is the probability of that phonological feature being present in the speech signal, as determined by analysing the speech signal.

13. The method according to claim 1, wherein the feedback depends on a sign of the deviation, and wherein optionally a positive sign implies that the phonological feature f should be increased, and a negative sign implies that the phonological feature f should be decreased.

14. The method according to claim 1, wherein a Finite State Transducer (FST) is used to identify which phoneme groups in the speech signal correspond to words such that phoneme insertions word boundaries can be identified.

15. The method according to claim 1, wherein the method further comprises setting a new target phrase based on the deviations by selecting words and/or phonemes containing the phonological feature(s) corresponding to the largest deviation(s).

16. The method according to claim 1, wherein the feedback indicates the phonemes and/or phonological features with the largest deviations from the target values.

17. The method according to claim 1, wherein no deviation is determined for phonological features for which the target value indicates that the phonological feature's presence is not specified.

18. A system for automatic speech analysis comprising one or more processors arranged to:
- set a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified;
- receive a speech signal, wherein the speech signal comprises a user's attempt to say the target phrase;
- analyse the speech signal to determine phonological features present within a portion of the speech signal corresponding to the target phoneme and assigning a probability to each of the set of phonological features;
- compare a probability assigned to each phonological feature based on the speech signal to the target value of that phonological feature within the target phrase;
- determine a deviation from the comparison; and
- output the deviation to provide feedback on the closeness of the speech signal to the target phrase.

19. A system according to claim 18 wherein the one or more processors are further arranged to:
- utilize an Automatic Speech Recognition (ASR) system to determine the phonological features present within the speech signal, and wherein the determination of the ASR is output to a further system arranged to determine the deviation and generate feedback;
- generate using an Automatic Speech Recognition (ASR) system probabilities of the set of phonological features being present within the speech signal;
- output using an Automatic Speech Recognition (ASR) system a vector representing the phonological features found within the speech signal;
- determine using an Automatic Speech Recognition (ASR) system which of the three values of present, absent, or not specified each of the phonological features should take;
- force align the speech signal with the target phrase;
- accept a speech signal having an expected set of phonemes present therein;
- determine the actual phonemes present in the speech signal, optionally using a Finite State Transducer (FST);
- insert phonemes at boundaries between words in the speech signal;
- determine the deviation as a deviation D(f|i) according to the formula:

$$D(f|i) = \begin{cases} 1 - P(f|i) & \text{if } g(f|p_i) = +1 \\ P(f|i) & \text{if } g(f|p_i) = -1, \\ 0 & \text{if } g(f|p_i) = 0 \end{cases}$$

wherein $g(f|p_i)$ is the target value for the phonological feature f of the target phoneme $p_i$ and P(f|i) is the probability of that phonological feature being present in the speech signal, as determined by analysing the speech signal;
- use a Finite State Transducer (FST) to identify which phoneme groups in the speech signal correspond to words such that phoneme insertions word boundaries can be identified;
- set a new target phrase based on the deviations by selecting words and/or phonemes containing the phonological feature(s) corresponding to the largest deviation(s); and any combination thereof.

20. A non-transitory computer-readable medium containing instructions which when read by a machine cause that machine to:
- set a target phrase, the target phrase comprising a target phoneme, the target phoneme having corresponding target values of a set of phonological features associated therewith, wherein each target value is one of: an indication that the phonological feature should be present, an indication that the phonological feature should be absent, or an indication that the presence of the phonological feature is not specified;
- receive a speech signal, wherein the speech signal comprises a user's attempt to say the target phrase;
- analyse the speech signal to determine phonological features present within a portion of the speech signal corresponding to the target phoneme and assigning a probability to each of the set of phonological features;
- compare a probability assigned to each phonological feature based on the speech signal to the target value of that phonological feature within the target phrase;
- determine a deviation from the comparison; and
- output the deviation to provide feedback on the closeness of the speech signal to the target phrase.

* * * * *